US006574476B1

United States Patent
Williams

(10) Patent No.: US 6,574,476 B1
(45) Date of Patent: *Jun. 3, 2003

(54) DYNAMIC ALLOCATION OF CARRIER FREQUENCIES IN A WIRELESS BROADBAND BASE STATION

(75) Inventor: Terry L. Williams, Melbourne Beach, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,188

(22) Filed: Oct. 15, 1999

Related U.S. Application Data
(60) Provisional application No. 60/104,441, filed on Oct. 15, 1998.

(51) Int. Cl.[7] .................................................. H04Q 7/20
(52) U.S. Cl. ........................ 455/452; 455/450; 455/452; 455/453; 455/456; 455/63; 455/67.1; 455/423; 455/446; 370/344; 370/343; 370/341
(58) Field of Search ................................. 455/450, 452, 455/453, 456, 67.1, 423, 446, 449, 444, 561, 507, 103, 132, 562, 436, 437, 509, 451, 447; 370/347, 431, 341, 343, 344, 329, 330

(56) References Cited

U.S. PATENT DOCUMENTS

| | | | | |
|---|---|---|---|---|
| 5,566,173 A | | 10/1996 | Steinbrecher | |
| 5,592,480 A | * | 1/1997 | Carney et al. | 370/347 |
| 5,794,157 A | | 8/1998 | Haartsen | |
| 5,809,422 A | * | 9/1998 | Raleigh et al. | 455/449 |
| 5,884,145 A | | 3/1999 | Haartsen | |
| 5,974,324 A | * | 10/1999 | Henson | 455/447 |
| 5,991,630 A | * | 11/1999 | Charas | 455/452 |
| 6,009,332 A | * | 12/1999 | Haartsen | 455/450 |
| 6,161,024 A | * | 12/2000 | Komara | 455/562 |
| 6,192,244 B1 | * | 2/2001 | Abbadessa | 455/436 |
| 6,195,782 B1 | * | 2/2001 | Rahmatullah et al. | 714/796 |
| 6,219,562 B1 | * | 4/2001 | Williams | 455/561 |
| 6,262,980 B1 | * | 7/2001 | Leung et al. | 370/336 |
| 6,317,423 B1 | * | 11/2001 | Jantti et al. | 370/347 |
| 6,370,386 B1 | * | 4/2002 | Williams | 455/452 |
| 6,400,697 B1 | * | 6/2002 | Leung et al. | 370/328 |

* cited by examiner

Primary Examiner—Nay Maung
Assistant Examiner—Joy K. Contee
(74) Attorney, Agent, or Firm—Akerman Senterfitt

(57) ABSTRACT

A sectorized wireless broadband base station (BBS) having two or more assigned absolute RF channel numbers (ARFCNs) for communications with mobile subscribers in a cellular communications network. The system includes a central processing unit for exclusively allocating one or more of the ARFCNs to each of the sectors, each sector providing a communication link for subscriber calls in one or more communication cells serviced by the BBS. Further, the system includes programming and hardware for exclusively allocating an additional one of the ARFCNs to the sector upon a number of the subscriber calls in any such sector reaching a predetermined limit which exceeds a capacity for the ARFCN.

12 Claims, 13 Drawing Sheets

DYNAMIC ALLOCATION OF CARRIER FREQUENCIES IN A WIRELESS BROADBAND BASE STATION

CROSS REFERENCE TO RELATED APPLICATIONS

This application claims the benefit of provisional application Ser. No. 60/104,441 filed Oct. 15, 1998.

STATEMENT REGARDING FEDERALLY SPONSORED RESEARCH OR DEVELOPMENT (Not Applicable)

BACKGROUND OF THE INVENTION

1. Technical Field

The invention concerns wireless communications equipment, and more particularly improvements to wireless base stations for cellular communications.

2. Description of the Related Art

Conventional wireless cellular communications systems have a common architecture in which one or more defined cell sites are formed by the placement of one or more base transceiver stations within a geographic area. A cell site is typically depicted as a hexagonal area in which a transceiver is located such that a radio communication link can be established between the cellular system and a plurality of mobile stations within the defined geographic area for the cell. A variety of standards exist for cellular telephone communications. For example, a common cellular system in the United States makes use of the advanced mobile phone service (AMPS). Other common systems include Nordic mobile telephone service (NMT), total access communications service (TACS), global system for mobile communications (GSM), IS-136 TDMA, and IS-95 CDMA systems.

Each of the above-identified systems makes use of a standard architecture associated with the particular system. For example, the basic architecture of a GSM type network is comprised of a base station subsystem (BSS) which includes a base station controller (BSC) and several base transceiver stations (BTS), each of which provides at least one radio cell with one or more radio frequency (RF) channels for communications with mobile subscribers. The purpose of the BSC is to control each of the BTS units within a region. This control process involves several functions, including allocating and selecting RF channels for transmitting each call and controlling handovers of calls from one BTS to another within the BSC's control region. When a mobile subscriber seeks to place a call, the mobile station will attempt to contact a local BTS. Once the mobile station establishes contact with the BTS, the mobile unit and the BTS will be time synchronized for permitting time division multiple access (TDMA) communications. Subsequently, a dedicated bidirectional signaling channel will be assigned to the mobile subscriber by the BSC.

Finally, the BSC will also set up a switching route to connect the mobile subscriber to a mobile switching center (MSC). The MSC provides a communication link from the BSC, and, as a result, all of the BTSs controlled by the BSC, to the public switched telephone network (PSTN), and performs all necessary call and signal routing to other networks to support mobile communications. This arrangement permits a mobile user or subscriber to move from cell to cell and still maintain service. This architecture is also particularly advantageous as it makes possible reuse of carrier frequencies from one cell to another.

The GSM system is designed to work in the 900 MHz and 1800 MHz bands, as well as the 1900 MHz PCS band in North America. GSM is essentially an all digital service. Each RF channel in the GSM system provides eight digital time slots due to the use of TDMA technology. Each of the RF channels are spaced 200 kHz apart from adjacent channels. The eight time slots supported by the TDMA technology enables each RF channel to be shared by more than one user. With TDMA, each user's voice communication is converted to a digital signal, which is allocated among one of the time slots in an assigned RF channel before being transmitted. In a GSM system, TDMA requires that all user subscriber signals using a single RF channel must arrive at the BTS at the proper time. Overlap of signals from the various mobile stations must be avoided and are ensured by proper signal transmission timing.

BTS equipment used in conventional cellular communication systems typically designates specific RF and signal processing equipment for each individual RF channel allocated to the BTS. This designation can most likely be attributed to the fact that each BTS has been conventionally configured to provide communication capability for only a limited number of predetermined channels in the overall frequency spectrum that is available to the service provider. In any case, each BTS is conventionally assigned at its initialization or during its construction, a set of RF channels on which it can communicate with subscribers. These assigned RF channels are generally carefully chosen so that the potential for interference between cells is minimized.

Within a particular BTS, a single omni-directional antenna can be used to receive and transmit signals to all mobile subscribers. However, a more common approach makes use of a plurality of directional antennas at the BTS site to split a cell into separate sectors, effectively transforming the one cell into multiple cells. Dedicated hardware in the BTS units are typically provided for handling communications for each sector. When using a sectorized approach, the RF channels assigned to a particular BTS must be further allocated among each of the sectors, since interference can be caused if multiple sectors processed by the BTS are operated on the same frequency. Each BTS is provided with DSP units to support communications processed by the particular BTS to which the DSP unit has been assigned. Conventional DSP units in such systems are pre-configured to operate on only the particular RF channels which have been assigned to a specific sector of the BTS.

Thus, DSP units are not generally fungible as between sectors of a particular BTS, and therefore these DSP units cannot be allocated from one sector to another. In cell sites that experience heavy traffic, this limitation can result in a poor allocation of system resources.

In particular, one of the problems with using sectorization in wireless base stations concerns trunking efficiency. Normally, a fixed number of RF carriers is assigned to a sector with the BTS concentrating traffic through a common interface to the PSTN. In many instances, traffic needs in one sector can occasionally exceed the sector's RF and processing resources while resources are available in another sector. However, because the number of RF channels allocated to a sector is fixed in conventional BTS system, those resources are blocked and left unused, lowering the trunking efficiency of the base station.

Omni-directional BTSs, i.e., those that are not sectorized, do not suffer from blocking. For example the Erlang capacity of a 2-carrier omni-directional base station is approximately the same as a sectorized base station using 3 carriers (one per sector). In this regard, it is well known that the sectorized system requires more resources. However, omni-directional base stations do not provide as high a degree of coverage as sectorized systems due to lower antenna gain. Another problem with omni-directional systems is that they cannot take advantage of higher frequency reuse schemes, therefore lowering overall system capacity.

Some companies, such as AirNet Communications Corporation of Melbourne, Fla., use a broadband base station (BBS) rather than the BTS described above.

Such systems are disclosed in U.S. Pat. Nos. 5,535,240 and 5,940,834. In this BBS, a broadband transceiver is used for transmitting and receiving a single composite wideband RF waveform that is comprised of a number of frequency channels, rather than the multiple narrow-band transceivers used in the BTS for transmitting and receiving individual frequency channels. By replacing the narrow band transceivers of the BTS with a broadband transceiver, this architecture reduces the number of transceivers required to process a given number of frequency channels; however, this alone still does not solve the trunking problem associated with the BTSs. The architecture and configuration of conventional BBSs may still suffer from limited trunking efficiency, as the BBS can still only process a fixed number of calls due to dedicated processing sources serving a specific transceiver and therefore a specific sector.

SUMMARY OF THE INVENTION

In a BBS system, one transceiver supports multiple carriers per sector, i.e., each RF channel is not assigned its own unique transceiver and processing hardware. The number of RF channels supported in each sector is therefore not constrained by RF transceiver equipment. Accordingly, RF carriers can be dynamically re-configured to meet changing traffic patterns in the multiple sectors of the BBS. For example, sectors facing major roadways can be more heavily used during morning and evening hours, while sectors directed toward population areas are more used during the middle of the day. Dynamic RF carrier allocation coupled with a broadband transceiver system in a sectorized BBS overcomes the blocking and inefficiency problem of a conventional sectorized BBS that occur when traffic needs in one sector of the BBS exceed its RF and processing resources while resources in another sector of the BBS are left unused. In addition to overcoming the blocking problem, the dynamic allocation of RF carriers of the invention retains the advantages of higher coverage and higher frequency reuse which are normally associated with cell sectorization.

These and other objects of the present invention are achieved by the subject method for dynamically allocating signal processing resources in a wireless multichannel broadband base station (BBS) for a cellular communications network. The method includes the steps of exclusively allocating one or more of the ARFCNs to each of two or more sectors, each sector providing a communication link for subscriber calls in one or more communication cells serviced by the BBS. Upon a number of the subscriber calls in any the sector reaching a predetermined limit which exceeds a capacity for the one or more ARFCNs, an additonal one of the ARFCNs is allocated to the sector. According to another aspect of the invention, the method can include the step of deallocating one or more of the ARFCNs from the sector when the subscriber calls in any the sector decrease below the predetermined limit.

For each ARFCN, the system allocates digital signal processing resources of the BBS to exclusively process subscriber calls received on the ARFCNs assigend to each sector. According to one aspect of the invention, each of the digital signal processors allocated to an ARFCN includes an RF processor (RFP) having two or more channel processors (CP) and a digital rate converter (RC) for translating a sample rate of a single baseband signal corresponding to any one of the ARFCNs.

According to another aspect of the invention, each of the digital signal processors is a channel processor (CP) for processing any of the traffic channels contained on a single ARFCN, each of the traffic channel corresponding to a subscriber call or a control channel. In this embodiment, the invention can include the step of multiplexing each of the traffic channels on a time division multiplexed communications bus, and selectively processing in each CP only the traffic channel for which the CP has been allocated.

According to another aspect, the invention includes a sectorized wireless broadband base station (BBS) having two or more assigned absolute RF channel numbers (ARFCNs) for communications with mobile subscribers in a cellular communications network. The system includes a central processing unit for exclusively allocating one or more of the ARFCNs to each of the sectors, each sector providing a communication link for subscriber calls in one or more communication cells serviced by the BBS. Further, the system includes programming and hardware for exclusively allocating an additional one of the ARFCNs to the sector upon a number of the subscriber calls in any such sector reaching a predetermined limit which exceeds a capacity for the ARFCN.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
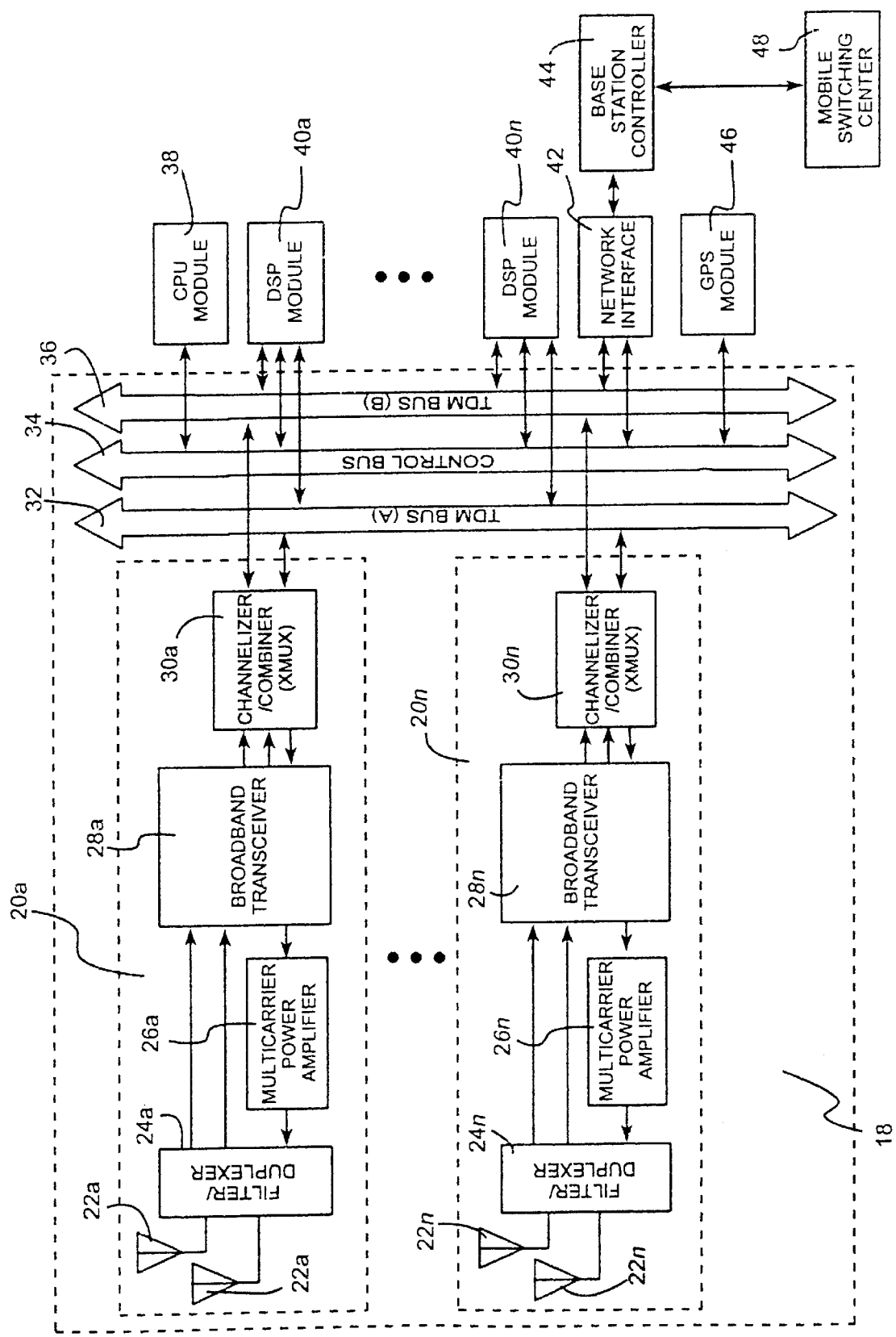
FIG. 1 is a block diagram of a broadband base station (BBS).

Referring to FIG. 1, a block diagram of an apparatus for increasing the number of calls processed by a base station, according to the present invention, is illustrated. A broadband base station (BBS) 18 communicates with a Base Station Controller (BSC) 44. The BSC 44 interfaces with multiple BBSs 18 for concentration of traffic to a Mobile Switching Center (MSC) 48. The BSC 44 performs mobility management and network interface management associated with mobile units as calls become active and terminate, as well as when mobile units move from the coverage area of one BBS 18 or cell to another.

Figure 2:
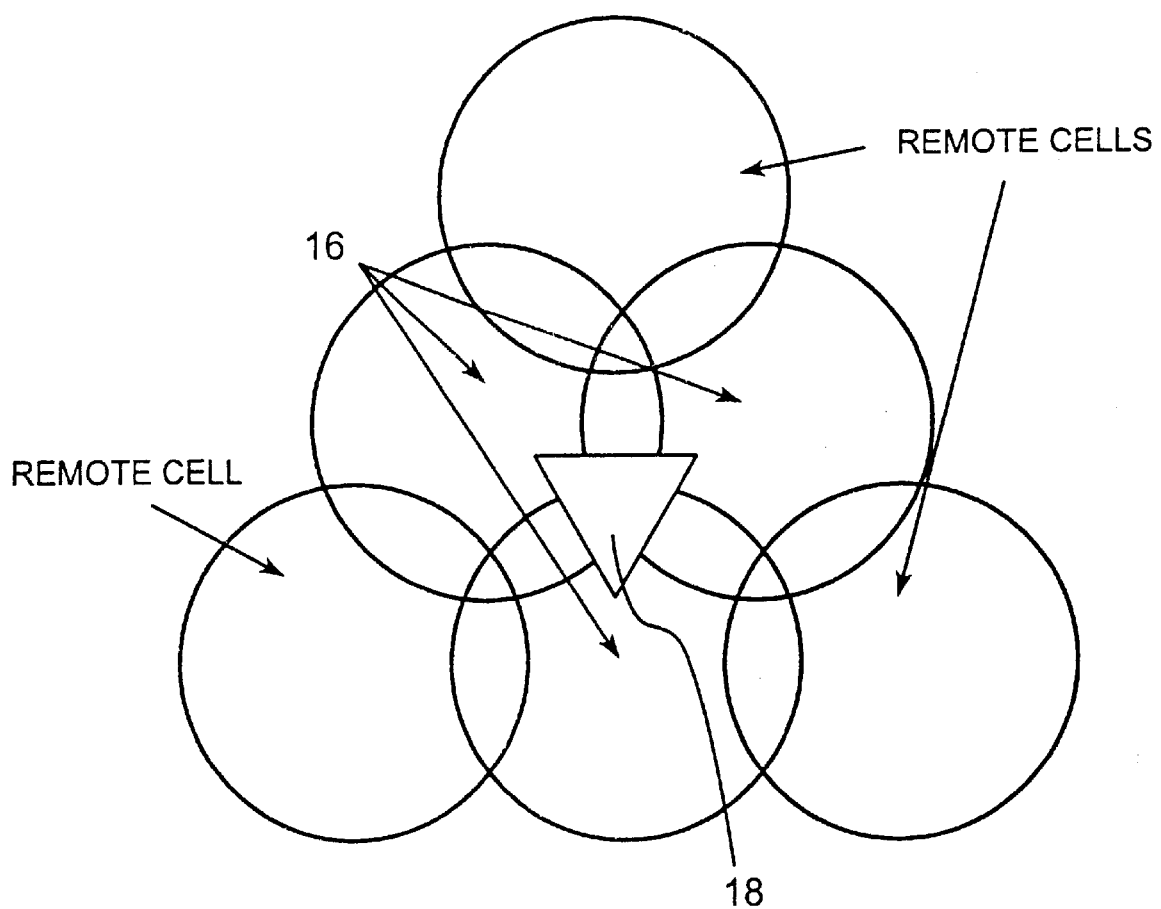
FIG. 2 is a diagram of a sectorized BBS system with remote base stations.

As shown in FIG. 2, the BBS 18 can support multiple sectors 14, each of which can support one or more cells 16. For each of the multiple sectors that the BBS 18 is separated into, the BBS 18 will contain a sector module 20a–20n. These sector modules 20a–20n will each have a set of two antennas 22a–22n, a filter/duplexer 24a–24n, a multicarrier power amplifier 26a–26n, a broadband transceiver 28a–28n, and channelizer/combiner 30a–30n.

The filter/duplexers 24a–24n within the sector modules 20a–20n provide for the filtering of the band-of-interest for each sector. For example, the U.S. PCS band is divided into 6 sub-bands designated band A through band F. A sector of the BBS 18 would be deployed with the filter/duplexer 24a–24n, for example, to accept a specific band-of interest, such as the C-band of the U.S. PCS band, and reject signals in all other bands. Each of the filter/duplexers 24a–24n also preferably combine a diversity receive input with a transmit output to enable use of a single antenna 22a–22n for both the reception and transmission of RF signals in each sector of the BBS 18.

The Multicarrier Power Amplifier (MCPA) 26a–26n provides amplification of transmitted signals sent from the sector modules 20a–20n to mobile units or repeaters located within their respective sectors. The MCPA 26a–26n is used in the BBS 18 since it amplifies multiple signals after the signals have been combined by the sector module 20a–20n for transmission to multiple mobile units or repeaters within the sector.

The Broadband Transceiver 28a–28n is capable of providing upconversion and downconversion of a portion of RF spectrum between a given band-of-interest for the sector module 20a–20n and an intermediate frequency (IF). In the present invention, the bandwidth of this transceiver 28a–28n is preferably about 5 MHZ. The transceiver 28a–28n is preferably tunable to any contiguous 5 MHz of spectrum in an operation band of a cellular communications network, such as all 6 subbands of the U.S. PCS band, among other things. In the present invention, the Broadband Transceiver 28a–28n preferably consists of two 5 MHz receivers and one 5 MHz transmitter. Each of the receivers are used for one of the two diversity reception paths. However, it should be noted that diversity reception is not required for the purposes of the invention and a single receiver could also be used.

The Channelizer/Combiner 30a–30n interfaces with the Broadband Transceiver 28a–28n to combine or channelize individual RF channels to or from the wideband IF signal of the Broadband Transceiver 28a–28n. On the receive path, the Channelizer port receives the wideband IF signal from the Broadband Transceiver 28a–28n and demultiplexes the radio signals contained in the wideband IF signal into separate individual baseband radio signals. There are preferably two identical receive paths on the Channelizer port for diversity processing as described above. On the transmit path, the Combiner port receives individual baseband radio signals and frequency multiplexes these radio signals so that they are combined onto one wideband IF signal, which is then transmitted by the Broadband Transceiver 28a–28n. The Channelizer/Combiner 30a–30n can also generally be referred to as the Transmultiplexer or XMUX in the present invention.

The Broadband Transceiver 28a–28n preferably performs its functions in the analog domain, while the Channelizer/combiner 30a–30n performs its functions in the digital domain. However, those skilled in the art will recognize that the invention is not limited in this regard.

In order to transform the wideband IF signal received by the channelizer port of the channelizer/combiner 30a–30n from an analog signal to a digital signal, an analog-to-digital converter (ADC) must be used. Furthermore, in order to transform the wideband IF signal received by the transceiver 28a–28n from a digital signal to an analog signal, a digital-to-analog converter (DAC) must be used. The ADC and DAC can be installed in the transceiver 28a–28n, or between the transceiver 28a–28n and channelizer/combiner 30a–30n. In the present invention, the ADC and DAC are preferably located on a separate module called the Broadband Converter Module (BCM) (not shown) which is placed between the transceiver 28a–28n and the channelizer/combiner 30a–30n.

The Network Interface module 42 transports traffic and control data between the BBS 18 and BSC 44. For example, the BSC 44 coordinates assignment of open RF channels in the BBS 18 to calls, assigns call transport links between the BBS 18 and the MSC 48, hands off calls between the BBS 18 and other base stations, and monitors the status of the BBS 18. In the present invention, this transportation is preferably implemented using a T1 or E1 module. However, any other suitable transport mechanism could be used to provide the same functionality.

The CPU 38 is preferably a programmable microprocessor that provides general configuration, monitoring and control functions to the BBS 18. The CPU 38 also controls allocation of DSP resources as shall be described in more detail below. Finally, the CPU 38 is also involved in the call processing functions of the BBS 18 that includes initiation and termination of calls, handover processing and allocation of resources.

The GPS module 46 provides a timing reference for TDMA protocols, i.e., time slots on the RF carrier on, for example, GSM and IS-136 systems. The GPS module 46 also provides a frequency reference for local oscillators used to implement the broadband transceiver 28a–28n.

TDM (A) Bus 32 is preferably a time-division multiplexed interface to transport sampled modulated baseband radio signals between a number of DSP modules 40a–40n and the channelizer/combiner 30a–30n. However, any standard device-interface can be used as the TDM (A) Bus 32 in the present invention, provided that this interface can transport the modulated baseband radio signals as required under the invention. In a preferred embodiment of the present invention, the TDM (A) Bus 32 is a custom designed interface for performing this function.

TDM (B) Bus 36 is also preferably a time-division multiplexed interface to transport demodulated traffic between the DSPs 40a–40n and the network interface module 42. However, any standard device-interface can be used as the TDM (B) Bus 36 in the present invention, provided that this interface can transport the demodulated traffic as required under the invention. In the present invention, this network interface 42 is preferably designed based on the Signal Computing System Architecture (SCSA), which is an industry standard for computer telephony.

The Control Bus 34 is used for configuration, control, and monitoring of the various modules of the BBS 18 by the CPU module 38. It is also used to pass control information between the CPU 38 and the BSC 44 of the BBS 18 via the network interface module 42. In the present invention, any standard device-interface can be used as the control bus 34 provided that this interface can transport the control information as required. In the present invention, the control bus 34 is preferably designed to the VME standard.

Figure 3:
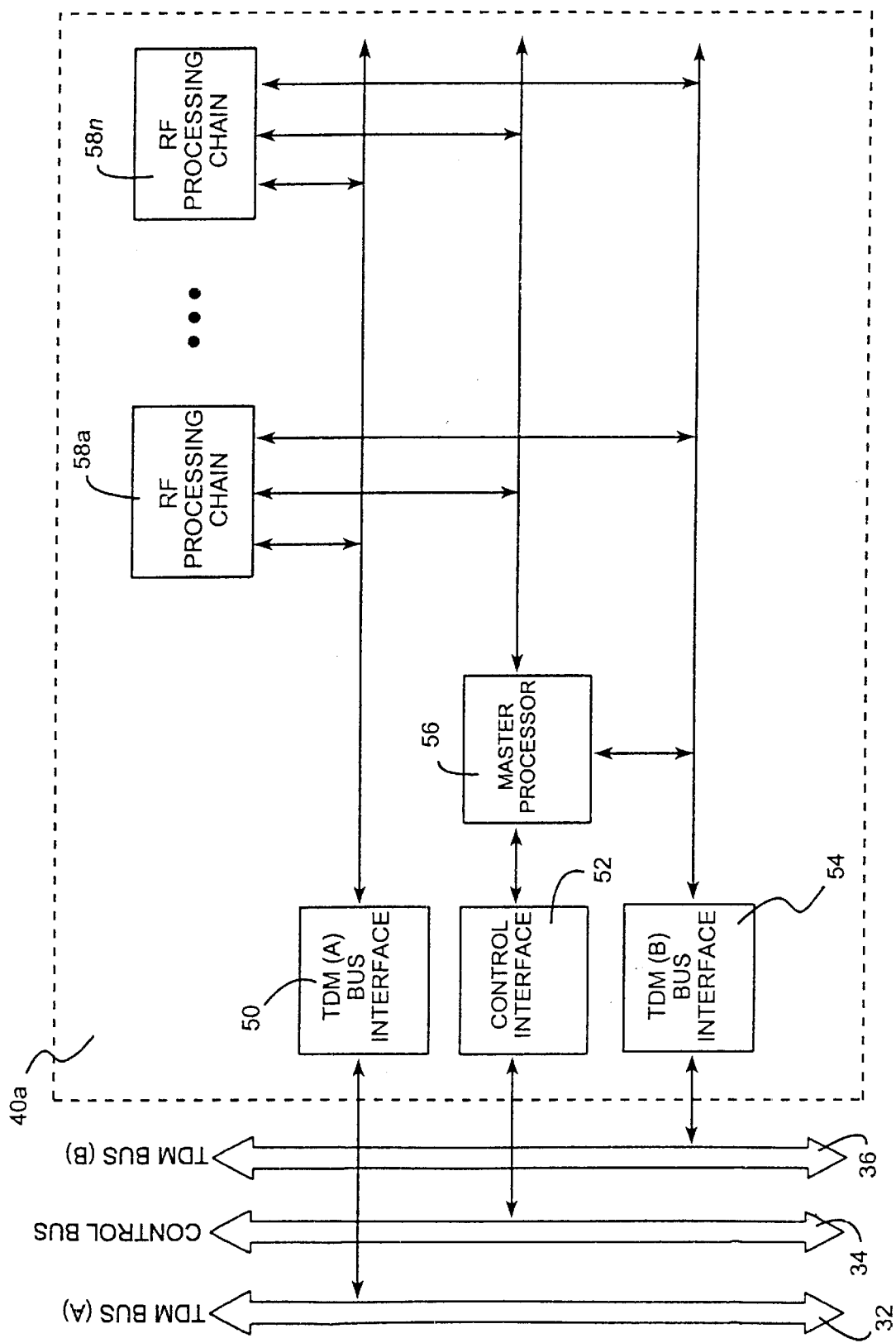
FIG. 3 is a block diagram of a digital signal processing (DSP) module within the BBS.

DSP modules 40a–40n possess a number of digital signal processors for processing, by either modulation or demodulation, of the baseband radio channels. Referring to FIG. 3, a preferred embodiment of the architecture of the DSP modules 40a–40n, is illustrated. The DSP modules 40a–40n consist of a TDM (A) Bus Interface 50, a Control Interface 52, a TDM (B) Bus Interface 54, a Master Processor 56 for configuration, control, and monitoring of the DSP modules 40a–40n, and RF Processing (RFP) chains 58a–58n for the processing of radio and traffic signals. In the present invention, the Master Processor 56 of the DSP modules 40a–40n is preferably implemented by using a single controller.

Figure 4:
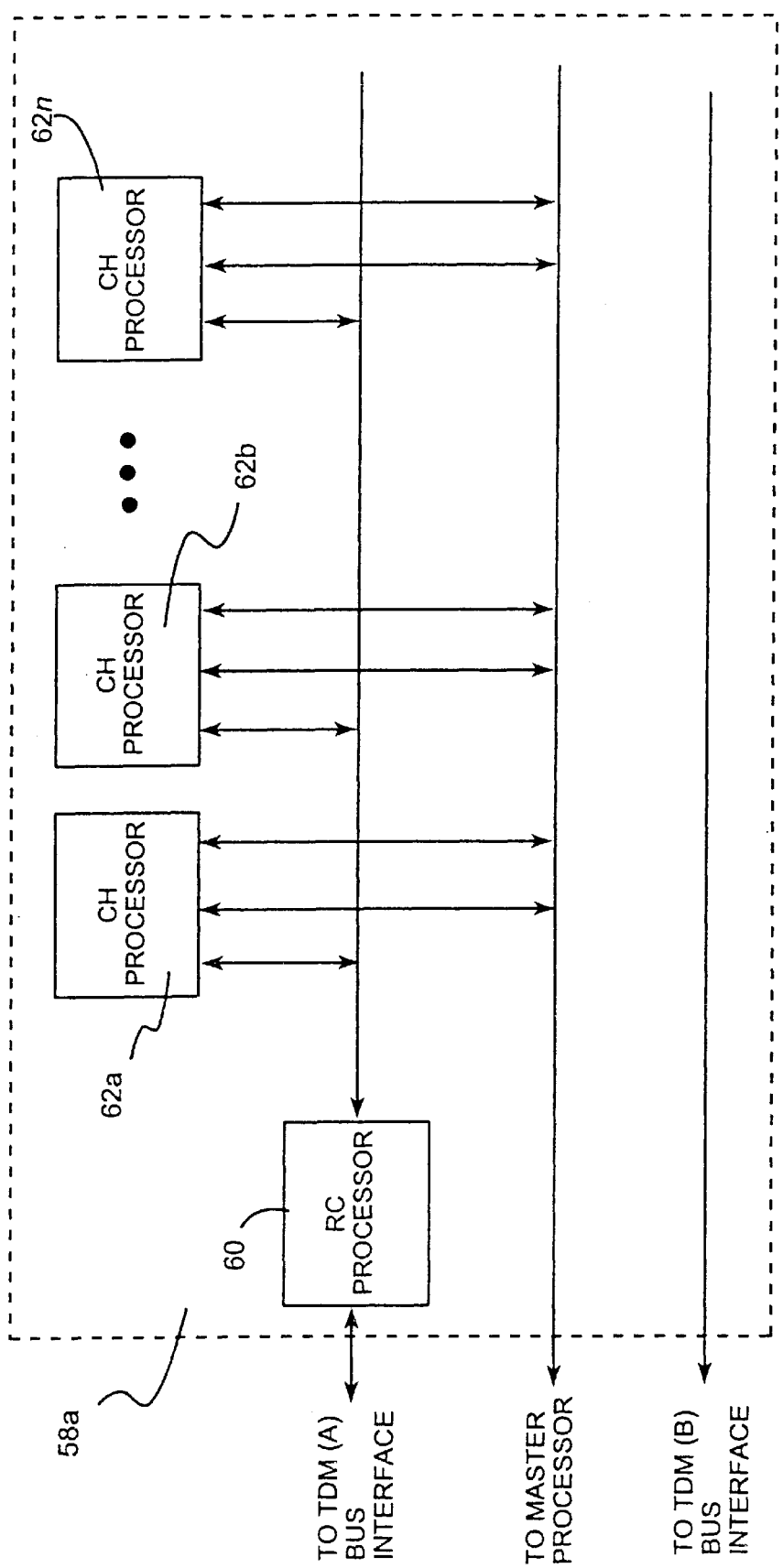
FIG. 4 is a block diagram of an RFP module within the DSP module.

Referring to FIG. 4, a preferred embodiment of the architecture of the RF processing chain 58a–58n, is illustrated. Each RF processing chain 58a–58n consists of a number of components. These components include a Rate Converter processor (RCP) 60, that performs rate conversion of the modulated baseband data transported from the channelizer/combiner 30a–30n to a rate that matches the bit rate of the modulated data stream. For example, for GSM signals, the channelizer/combiner 30a–30n can sample the radio carrier at 320 kilosamples per second. However, the data rate of a GSM bit stream is approximately 270.833 kilobits per second. The RCP 60 can resample the rate of any modulated baseband data into any desired bit stream. For example, the RCP 60 would resample the signal sent from the channelizer/combiner 30a–30n to achieve a synchronized one-bit per sample signal.

Each RFP 58a–58n also contains one or more channel processors (CP) 62a–62n for performing signal processing functions. Thus, another important function of the RCP 60 of each of the DSP modules 58a–58n is that it multiplexes and demultiplexes data in the time slots of the RF channel sent to and from CPs 62a–62n. Each time slot of the RF channel sent to and from CPs 62a–62n contains either traffic for a single call or control information.

The CPs 62a–62n process traffic transmitted over the time slots of RF channel received from the channelizer/combiner 30a–30n, respectively. The processing performed by the CPs 62a–62n includes, for example, removing any correction or encryption algorithms placed in the traffic signal in order to make it more robust during transmission, as well as demodulating the traffic signal so that it can be sent to, for example, the PSTN. Furthermore, the CPs 62a–62n also modulate traffic signals received from, for example, the PSTN, and add correction and encryption algorithms to the traffic signal to ensure the robustness of the signal while being transmitted to a mobile unit from the antenna 22a–22n of the BBS 18.

In the present invention, it is preferable that each time slot is processed by a separate CPs 62a–62n and the RCP 60 divides the RF channel into these individual time slots for this processing. However, in future implementations of the present invention, when higher speed processors are available for use, a single CP 62a–62n can be used to process multiple time slots.

In the architecture of the BBS 18 illustrated in FIG. 1, each sector that the BBS 18 is divided into preferably has its own sector module 20a–20n. However, the sectors of the BBS 18 share the processing resources of the other modules of the BBS 18, such as the CPU module 38, the DSP modules 40a–40n, the network interface 42, and the GPS module 46, among other things. These modules are called upon to process calls and performs other functions as needed for any and all sectors. Additionally, each sector can be further divided into one or more cells. The resources of the modules can be allocated to process calls in any of these cells.

Furthermore, in the present invention, the BBS 18 is preferably software programmable. When the BBS 18 is software programmable, the present invention can generally be used for multiple system architectures, such as GSM, IS-136 or CDMA, among others, without major hardware modifications. For example, if the BBS 18 were originally used in a GSM system and it was desired that the BBS 18 be modified for use in supporting an IS-136 air-interface protocol, software used by the sector module 20a–20n hardware would merely be reprogrammed to process the narrower bandwidth carriers of the IS-136 protocol. In addition, the software used in the DSP modules 40a–40n would be programmed for modulation and demodulation associated with the IS-136 protocol, rather than the GSM protocol.

Alternatively, if the BBS 18 were to be modified for use with a CDMA protocol, such as a Wideband CDMA (WCDMA) protocol, a hardware modification can need to be made to the sector modules 20a–20n in which the channelizer/combiner 30a–30n is replaced by a CDMA spreader/despreader module. However, in this modification, there would most likely be no changes to the hardware of the broadband transceiver 28a–28n or DSP module 40a–40n of the BBS 18.

In the conventional implementation of DSP resources, RFP 58a–58n is preconfigured and assigned to support a specific RF carrier for a specific cell in a sector. This assignment is fixed in conventional systems, and the RFP 58a–58n is solely dedicated to processing calls on the configured RF carrier for the specific cell, regardless of whether there is active traffic on that RF carrier or cell. For example, if a base station were broken down into two sectors, each containing a single cell, and each sector were allocated sufficient RFPs 58a–58n for processing seven calls, then no sector could process more than seven calls at any given time—even if the other sector is not processing any calls at that time. This would result in a number of unused resources in DSP modules at any given time, which is extremely inefficient.

In the present invention, the RFPs 58a–58n that are resident in the BBS 18 are allocated and deallocated dynamically. This dynamic allocation and deallocation allows for the BBS 18 to contain fewer RFPs 58a–58n while still effectively servicing the same traffic capacity as the conventional base station configuration. Additionally, if the BBS 18 were provided with the same number of RFPs 58a–58n as are found in a conventional base station, the BBS 18 would have the ability to service a higher traffic capacity than the conventional base station configuration would allow. In the present invention, this dynamic allocation and deallocation can be used for generally any system protocol, such as the GSM, IS-136 or CDMA protocols, among others.

Referring to FIGS. 5–9, a method for increasing the amount of traffic processed by a BBS 18, according to the present invention, is illustrated.

Figure 5:
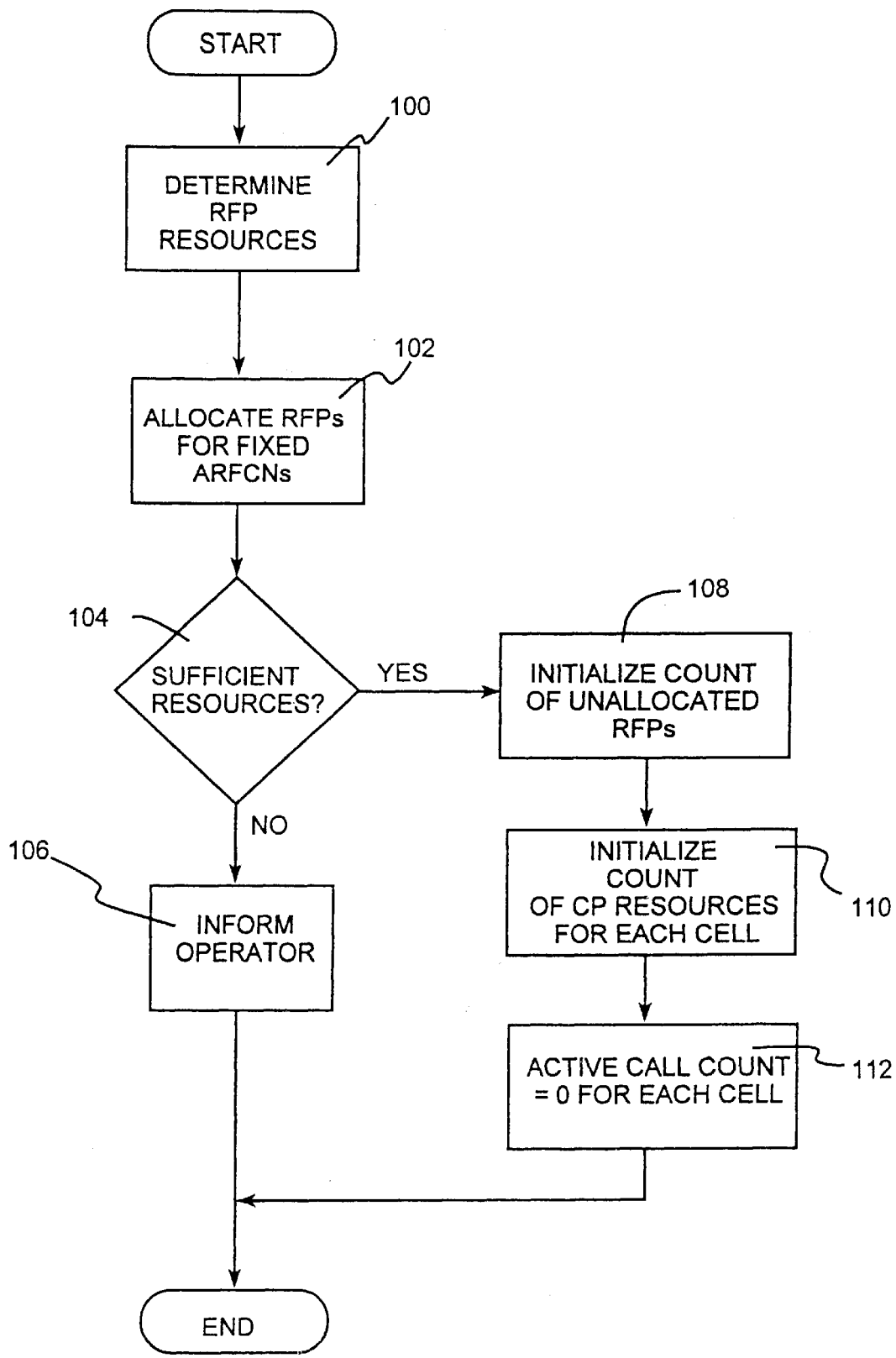
FIG. 5 is a flowchart of the method of initializing the dynamic allocation of DSP modules within the BBS.

FIG. 5 illustrates the initialization process for the dynamic allocation of RFP modules 58a–58n within the BBS 18. First, the available resources, or the number of available RFPs 58a–58n, of the BBS 18 must be determined in step 100.

In step 102, if the system in which the present invention is being used is one which requires the use of a control channel in some or all of the RF channels, or absolute RF channel numbers (ARFCN), allotted to each cell, then one RFP 58a–58n in the BBS 18 must be fixed to each of those ARFCNs that require a control channel. However, if the present invention is used in a system architecture that does not require the use of control channels in either ARFCNs or the cells to which the ARFCNs are allotted, then this step is not required. If an RFP 58a–58n is assigned to an ARFCN in step 102, one of the CPs 62a–62n of the fixed RFP 58a–58n would be used to process the control channel of the ARFCN. The rest of the CPs 62a–62n of the assigned RFP 58a–58n would then be assigned for processing traffic in the ARFCN as new calls are initiated within the cell.

In step 104, a determination must be made as to whether there are sufficient RFPs 58a–58n to be assigned to each ARFCN with a control channel. If not, then in step 106 an operator is informed that the BBS 18 is not sufficiently provisioned to support the configuration defined for the BBS 18 and the process terminates. If sufficient resources are available, then in step 108 a count of the remaining unassigned RFPs 58a–58n is determined by subtracting the assigned RFPs 58a–58n for control channels from the total number of RFPs 58a–58n determined in step 100.

In step 110, a count of the number of CPs 62a–62n available for use per cell is made. This count includes a determination of the number of CPs 62a–62n available per cell in total, as well as the number of calls which are active in the cell at any given time. At initialization of the BBS 18, this count would be a count of CPs 62a–62n available for processing traffic that had been assigned to the ARFCNs of the cell. For example, if the BBS 18 is configured for use in a GSM system, an ARFCN allotted to a cell would require a control channel, and a CP 62a–62n to process this control channel. Since an RFP 58a–58n in a GSM system contains eight CPs 62a–62n, this would leave seven CPs 62a–62n assigned to the ARFCN that are available for processing traffic. Thus, the count of available CPs 62a–62n for that cell would be seven, or seven times the number of ARFCNs allotted to the cell.

In step 112, the active call count is set to zero as described below. These two variables—total CPs 62a–62n available and number of active calls—are used to check for fragmentation of RFPs 58a–58n in order to consolidate the processing of calls to the fewest number of RFPs 58a–58n at any given time.

Figure 6:
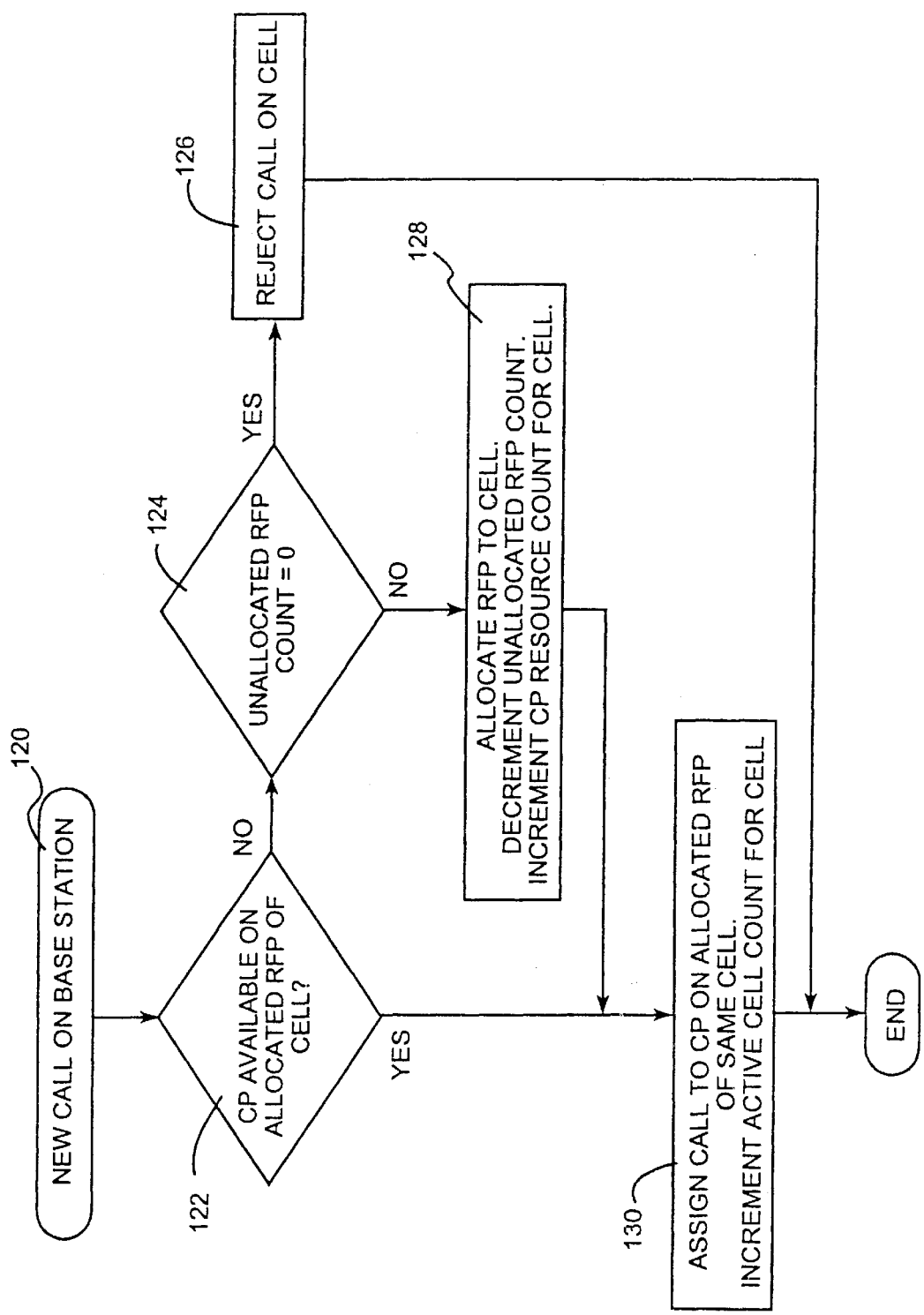
FIG. 6 is a flowchart of the method of assigning RFP resources within a BBS to new calls initiated within a given sector.

FIG. 6 illustrates the method of assigning new calls to an RFP 58a–58n as preferred in the present invention. In step 120, the BBS 18 receives a new call. This new call can be one initiated on a cell of the BBS 18, or it can be the result of a handover from a cell of another base station. In step 122, a determination is made as to whether a CP 62a–62n is available to process the call in an RFP 58a–58n that is already allocated to the cell in which the call is received. If there is an available CP 62a–62n, then in step 130 the call is assigned to that CP 62a–62n for processing. Also in step 130, the count of calls active on the cell, as described in step 112, is incremented by one.

In step 122, if there is not an available CP 62a–62n on an existing RFP 58a–58n allocated to the cell in which the call is received, then in step 124 a determination must be made as to whether there is an unallocated RFP 58a–58n available to be allocated to the cell so that a CP 62a–62n can process the call. If there is an available unallocated RFP 58a–58n (i.e., the unallocated RFP count does not equal zero), then in step 128 the available RFP 58a–58n is allocated to the cell to process the call. Also in step 128, the count of unallocated RFPs 58a–58n, described in step 108, is decremented by one. Further in step 128, the count of available CPs 62a–62n in the cell, as described in step 110, is incremented by the number of CPs 62a–62n found in the RFP 58a–58n. For example, in a GSM system there could be eight CPs 62a–62n contained in an RFP 58a–58n, so as to provide one CP 62a–62n for each TDMA time slot. In that case, the number of available CPs 62a–62n would be incremented by eight when an additional RFP 58a–58n is allocated to the cell for processing of the call. In the present invention, this incremental value can be different if other system architectures are used.

If there is no available unallocated RFP 58a–58n and all of the CPs 62a–62n of the RFPs 58a–58n allocated to cell are in use, then in step 126 the BBS 18 must reject the call. The manner of the rejection of the call by the BBS 18 can be handled in a number of ways that are consistent with practices currently performed. If the new call is associated with a handover of a call to a cell of the BBS 18 from another base station, a mobility processing management function of the BBS 18 can be informed to try to assign the call to the next best cell. If the new call is initiated within the cell of interest and the BBS 18 supports a directed handover function, the call can be directed to attempt access on another cell. If directed handover is not available, the call can be dropped and an associated measurement count of dropped calls is incremented with the appropriate cause code in the CPU 38 or BSC 44. This measurement provides a means for a system operator to know the frequency that calls are rejected due to unavailable resources and can prompt the operator to provision the BBS 18 with additional processing hardware, such as additional DSP modules 40a–40n.

Figure 7:
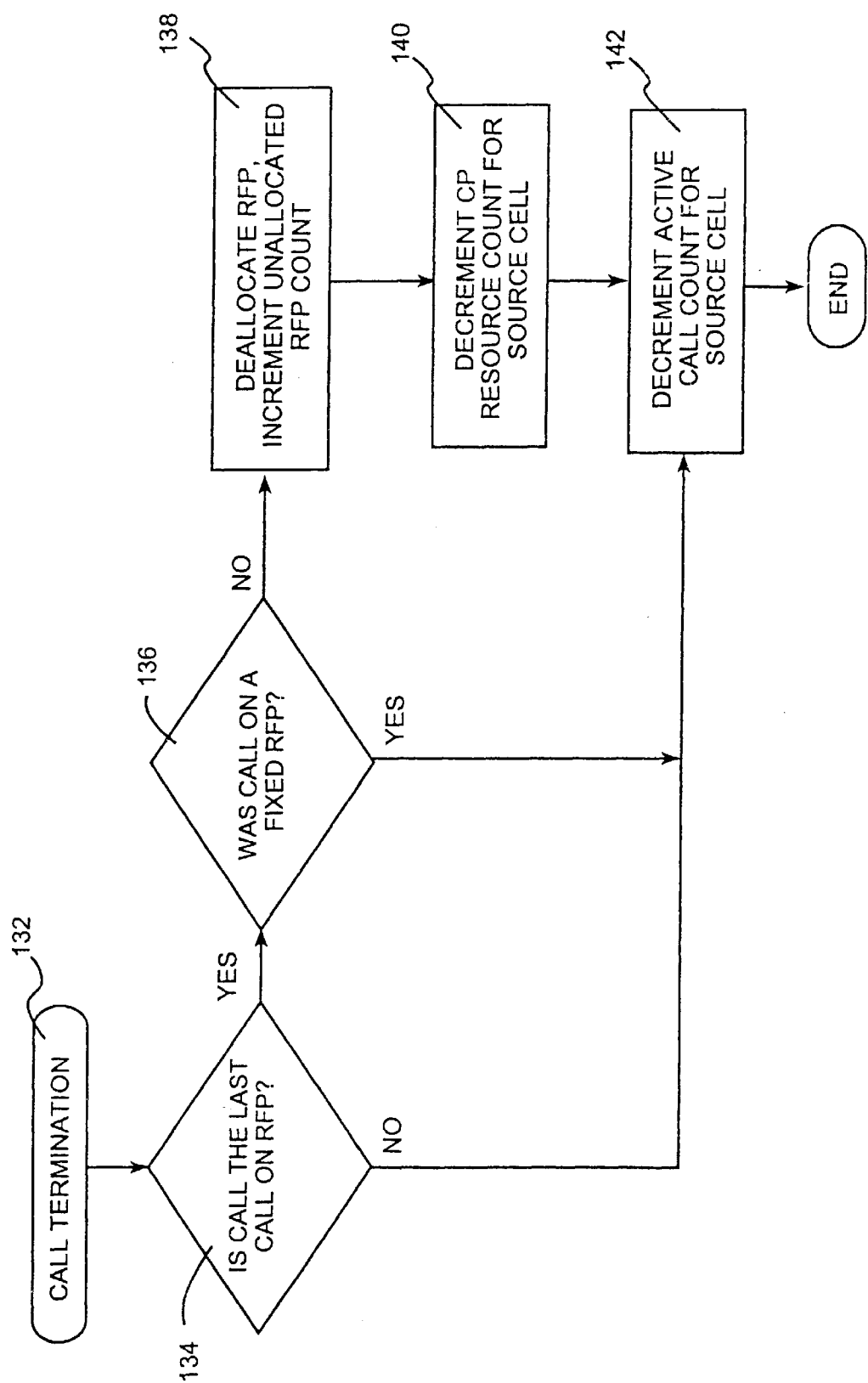
FIG. 7 is a flowchart of the method of deallocating RFP resources within a BBS upon the termination of a given call.

FIG. 7 illustrates a method for terminating a call on a given cell under the present invention. Termination within the given cell can be a result of the caller(s) hanging up or the call being dropped for some reason, such as a mobile unit moving beyond the coverage of any cell and a handover to another base station from the BBS 18 not being possible. First, a BBS 18 receives notification that the call is terminated in step 132. In step 134, a determination is made as to whether the call was the last call being processed by the CPs 60a–60b of the associated RFP 58a–58n.

If the call was the last call being processed by the RFP 58a–58n, a determination is made in step 136 as to whether or not the RFP 58a–58n is assigned to a specific ARFCN to provide that ARFCN with a control channel processor. If the RFP is not fixed to the ARFCN, then in step 138 the unassigned RFP 58a–58n is deallocated from the cell. Furthermore, in step 138 the count of the unallocated RFPs 58a–58n, described in step 108, is incremented by one. In step 140, the count of CPs 62a–62n available for use by the cell, as described in step 110, is decremented.

The amount by which the CP count is decremented in step 110 is dependent on the system or protocol in which the invention is used. For example, in the GSM system, a typical RFP 58a–58n can have eight CPs such that the CP count is decremented by eight every time an RFP 58a–58n is deallocated from the cell. In step 142, the count made of the amount of traffic active in the cell 112 is decremented by one for each terminated call.

Figure 8:
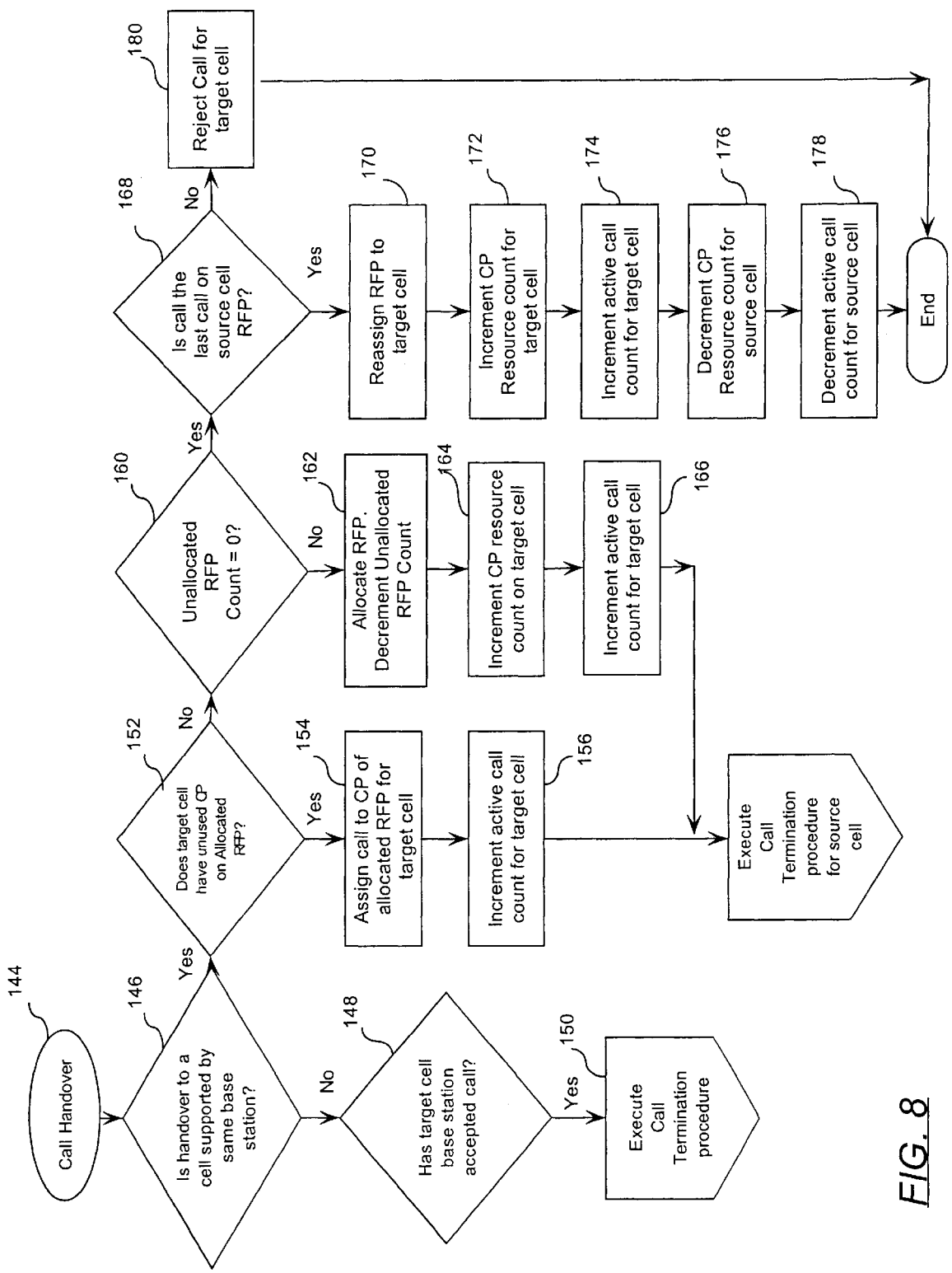
FIG. 8 is a flowchart of the process for allocating RFP resources within a BBS upon the handover of a call.

FIG. 8 illustrates a situation where a call handover, or transfer of a call being processed in one cell to another cell for processing, is initiated within a cell of the BBS 18. In step 146, a determination is made as to whether the BBS 18 is attempting to handover the call to a cell within the BBS 18 or to a cell in another base station. In step 148, if the handover is attempted for another base station, the BBS 18 must determine whether the target cell of the target base station accepts the call. In step 150, the BBS 18 executes the call termination procedure illustrated in FIG. 7 if the target cell accepts.

If the BBS 18 is attempting to handover the call to a cell within the BBS 18, then in step 152 a determination must be made as to whether an RFP 58a–58n allocated to the target cell within the BBS 18 has a CP 62a–62n which is free to process the handover call. In step 154, a free CP 62a–62n allocated to the target cell will be assigned the handover call. In step 156, the count made of the amount of traffic active in the cell in step 112 is incremented by one for each handover call received. In step 158, the BBS executes the call termination procedure illustrated in FIG. 7 following the handover.

In step 160, a determination must be made as to whether there are unallocated RFPs 58a–58n available in the BBS 18 for allocation to the target cell. If there is an unallocated RFP 58a–58n in the BBS 18, then in step 162 the unallocated RFP 58a–58n is allocated to the target cell. Furthermore, in step 162, the count of the unallocated RFPs 58a–58n, described in step 108, is decremented by one. In step 164, the count of CPs 62a–62n available for use by the cell in step 110 is incremented. In step 166, the count made of the amount of traffic active in the cell in step 112 is incremented by one for each call accepted for processing by the target cell.

If there are no unallocated RFPs 58a–58n available in the BBS 18, then a determination must be made as to whether the call being processed by the RFP 58a–58n in the source cell of the BBS 18 is the last call on that RFP 58a–58n being processed. In step 170, the BBS 18 reallocates the RFP 58a–58n from the source cell to the target cell and the RFP 58a–58n will process the handover call in the target cell. In step 172, the count of CPs 62a–62n available for use by the target cell, as described in step 110, is incremented. In step 174, the count made of the amount of traffic active in the target cell, as described in 112, is incremented by one for each call accepted for processing by the target cell. In step 176, the count of CPs 62a–62n available for use by the source cell, as described in step 110, is decremented. In step 178, the count made of the amount of traffic active in the source cell, as described in 112, is decremented by one for each call transferred from the source cell.

If the call sought to be handed over from the source cell to the target cell is not the last call being processed by the RFP 58a–58n in the source cell and there are no unallocated RFPs 58a–58n in the BBS 18, then the BBS 18 cannot handover the call from the source cell to the target cell in step 180.

It is possible that a larger than necessary number of RFPs 58a–58n can be allocated by the CPU 38 to a cell at any given time. These allocated RFPs 58a–58n could be reduced by consolidating the calls being processed into fewer RFPs 58a–58n. For example, eight calls can be received by the BBS 18 and become active traffic in a given cell. In the GSM system architecture (assuming that there are eight CPs 62a–62n available on each RFP 58a–58n), seven of the eight calls would be assigned to the CPs 62a–62n of the RFP 58a–58n fixed to the ARFCN of the cell, while an unallocated RFP 58a–58n would also need to be allocated to the cell by the BBS 18 to provide an additional CP 62a–62n for processing the eighth call. At some time while these calls are being processed by these two RFPs 58a–58n, a call on the fixed RFP 58a–58n might be terminated. This would leave six of the CPs 62a–62n processing calls, while one CP 62a–62n is left unused. If the call being processed by the CP 62a–62n in the allocated RFP 58a–58n could be transferred to the unused CP 62a–62n of the fixed RFP 58a–58n, then the allocated RFP 58a–58n could be deallocated from the cell and available to be allocated by the BBS 18 to another cell. This consolidation would thereby maximize the efficiency of the DSP modules 40a–40n of the BBS 18.

Figure 9:
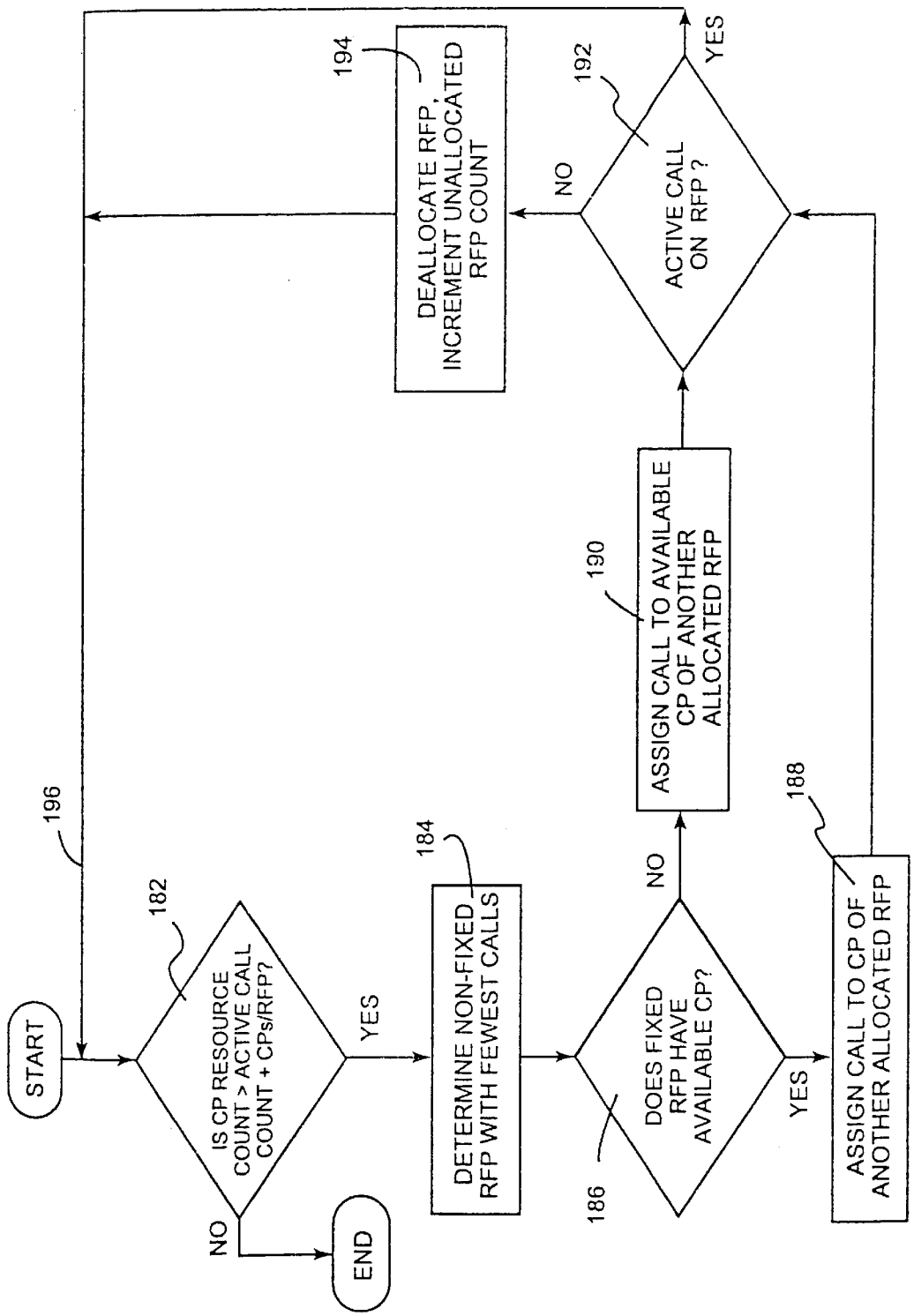
FIG. 9 is a flowchart of the consolidation of RFP resources within a BBS.

FIG. 9 illustrates a method for consolidating a maximum number of calls on a minimum number of RFPs 58a–58n. This routine can be invoked at any time, such as, for example, at a predetermined time interval, any time a call is terminated, or any time a call is handed over, among other times. In step 182, a determination is made as to whether the number of unused CPs 62a–62n allocated to a given cell exceed the number of CPs 62a–62n that are supported by an RFP 58a–58. If so, then the calls being processed by the CPs 62a–62n on a given cell can be consolidated in a manner that allows an RFP 58a–58n on the cell to be deallocated. In step 184, a determination is made as to which of the RFPs 58a–58n allocated to the cell is processing the fewest calls. In step 186, a determination is made as to whether there are CPs 62a–62n available on the fixed RFP 58a–58n for the cell. In step 188, the call is assigned to a free CP 62a–62n of the fixed RFP 58a–58n, if the fixed RFP 58a–58n has an available CP 62a–62n. If there are no free CPs 62a–62n available on the fixed RFP 58a–58n, then in step 190 another allocated RFP 58a–58n is chosen for receiving the calls for consolidation. In step 192, a determination is made as to whether any other active calls are present on the RFP 58a–58n with the fewest calls. If so, then in step 196 the process of consolidation is repeated. If no other calls are active on the RFP 58a–58n, then the RFP 58a–58n is deallocated from the cell in step 194. Also in step 194, the unallocated RFP count, as described in step 108, is incremented. The entire method illustrated in FIG. 9 can be executed until there are no longer any calls that can be reassigned in the cell in a manner which would allow an RFP 60a–60n in the cell to be deallocated.

In addition to the embodiment of the invention disclosed in FIGS. 1–9, an alternative embodiment for increasing the amount of calls that can be processed by a finite number of processing resources can also be used. The disadvantage of the embodiment disclosed in FIGS. 1–9 is that in that embodiment, a number of CPs 62a–62n can be left unused when the RFP 58a–58n is allocated to a given cell. For example, if an RFP 58a–58n has eight CPs 62a–62n, then the fixed RFP 58a–58n for that cell can only process seven calls at any time (one CP 62a–62n is assigned as a control channel). Thus, an additional RFP 58a–58n is allocated to this cell to process any additional calls that cannot be processed by the fixed RFP 58a–58n.

The previous discussion describes an invention for dynamically allocating DSP module 40a–40n resources in a conventional BBS 18 architecture. An alternate architecture to that illustrated in FIGS. 1–4 can be used to make more efficient use of the CPs 62a–62n of a given DSP module 40a–40n. This alternative architecture further reduces the number of hardware processing resources, such as CPs

62a–62n, needed to achieve a given traffic processing capacity for the BBS 18.

FIGS. 3 and 4 depict the DSP module 40a–40n of the conventional BBS 18 architecture, in which the RCP 60 is coupled with the CPs 62a–62n. In these figures, the RCP 60 and CPs 62a–62n were integrated as part of the RFP 58a–58n. In conventional systems, when this combination of the RCP 60 and CP 62a–62n is provided as part of the RFP 58a–58n, the CPs 62a–62n in a given RFP 58a–58n can only practically be used to process traffic on a single ARFCN. Thus, if not enough calls are being transmitted over the eight time slots of a given ARFCN, an RFP 58a–58n allocated to that ARFCN might have CPs 62a–62n that are left unused. If the CPs 62a–62n were de-coupled from the RCPs 60 in the RFP 58a–58n, then more efficient use of the CPs 62a–62n could be implemented in processing traffic in the BBS 18. The efficiency of the CPs 62a–62n is increased because the CPs 62a–62n would not all be required to process calls transmitted over the same ARFCN.

Further, in the conventional BBS 18 architecture illustrated in FIGS. 1–4, an entire ARFCN is transferred on the TDM (A) Bus 32, including time slots of the ARFCN that are not carrying active calls. If the function of the RCP 60 were moved from the RFPs 58a–58n, then the architecture of the BBS 18 could be reconfigured so that only time slots of the ARFCN that are carrying active calls would be transferred to the DSP modules 40a–40n. For example, in the GSM system architecture illustrated in FIG. 1, the RCP 60 could be moved into the channelizer/combiner 30a–30n. This repositioning of the RCP 60 would make more efficient use of both the TDM (A) Bus 32 and CPs 62a–62n, because it would allow the transfer of only active calls from the sector modules 20a–20n to the CPs 62a–62n over the TDM (A) Bus 32. Further, it would permit data for any traffic channel to be selectively directed to any available CP 62a–62n using the addressing capabilities of the TDM (A) Bus 32.

Figure 10:
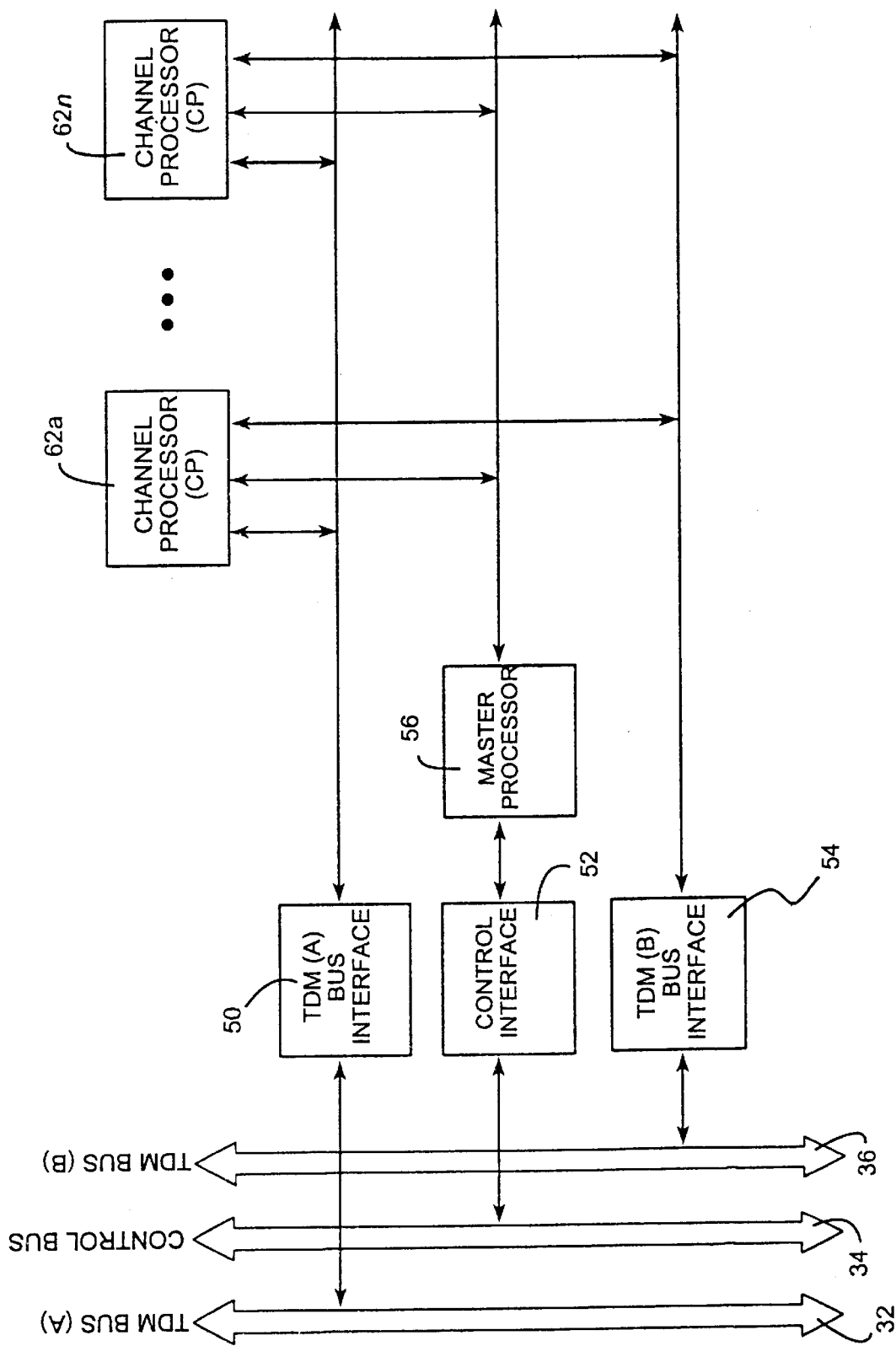
FIG. 10 is a block diagram of an alternative DSP architecture that allows for the allocation of individual RF channel processors.

Referring to FIG. 10, an alternate architecture for performing digital signal processing in a base transceiver station in the GSM system architecture, according to a present invention, is illustrated. In FIG. 10, the RCP 60 has been moved from the DSP module 40a–40n, as illustrated in FIG. 4, to the channelizer/combiner 30a–30n. FIG. 10 illustrates an alternate digital signal processor, similar to that illustrated in FIG. 4, wherein traffic and control data processed by the BBS 18 are transferred directly between the TDM (A) Bus 32 and the CPs 62a–62n found in the BBS 18. In general, each of these CPs 62a–62n process one call transmitted along an ARFCN or one control channel of an ARFCN. However, with the availability of high-speed digital signal processors today, the CPs 62a–62n depicted in FIG. 10 will soon be capable of processing information transmitted along multiple TDMA time slots. With the architecture illustrated in FIG. 10, the allocation of CPs 62a–62n in the BBS 18 is simplified. The CPs 62a–62n are logically separated so that not all of the CPs 62a–62n of a given RFP 58a–58n are required to be allocated in a group. Therefore, using this alternative architecture, none of the CPs 62a–62n are restricted to process traffic or calls on a specific ARFCN. Likewise, the algorithms for allocating CPs 62a–62n to different ARFCNs illustrated in FIGS. 5–9 are simplified.

Figure 11:
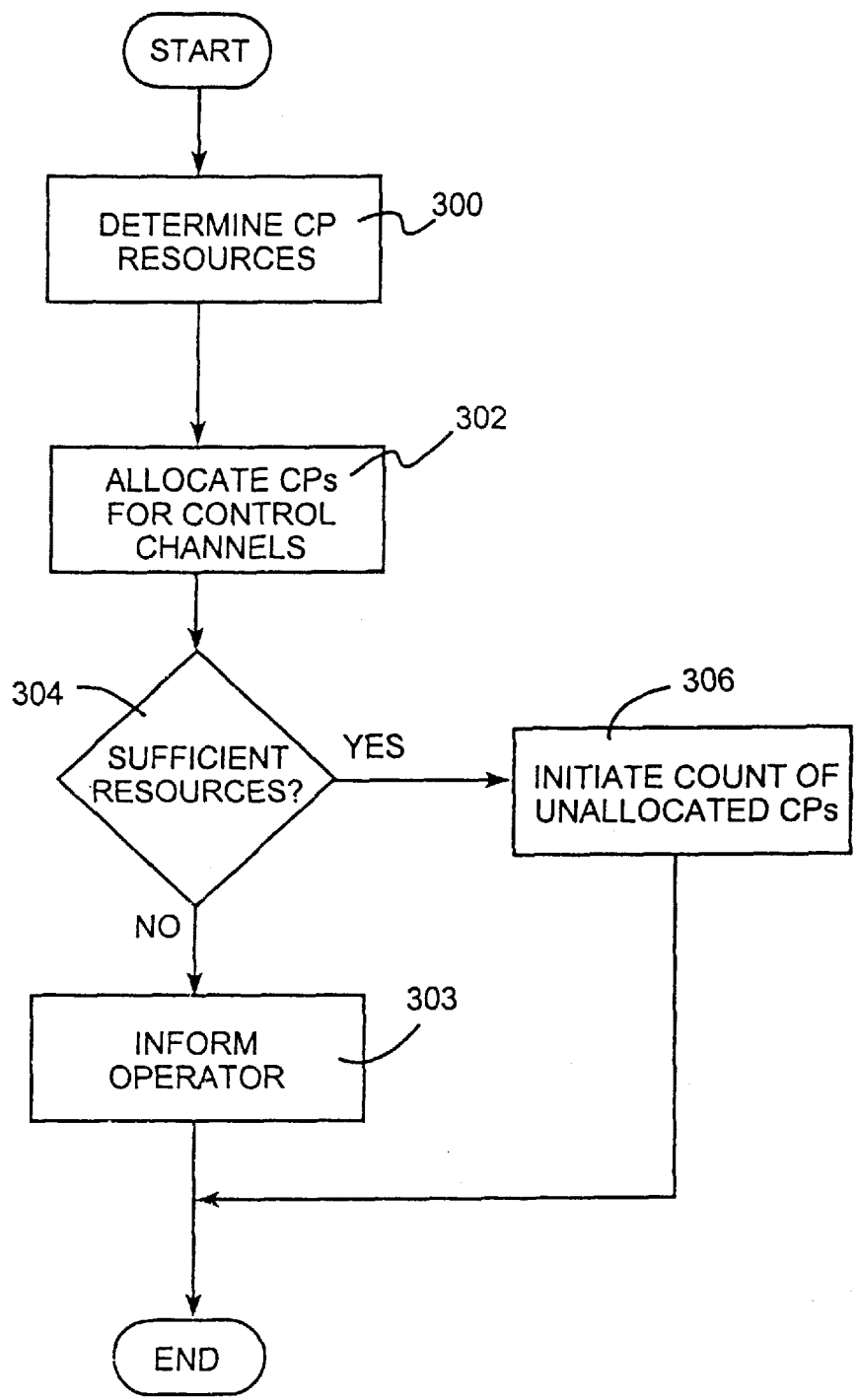
FIG. 11 is an initialization flowchart for individual CP allocation within a BBS for processing calls.

In FIG. 11, a method for allocating individual CPs 62a–62n for the processing of calls transmitted on an ARFCN, according to an embodiment of a present invention, is illustrated. In step 300, a determination of the CPs 62a–62n available for use in the BBS 18 must be made.

In step 302, one CP 62a–62n is allocated to each control channel of the BBS 18. In step 304, a determination is made as to whether there are sufficient CPs 62a–62n to be allocated to the ARFCNs allotted to the BBS 18. If not, then in step 308, an operator can be informed that there are insufficient processing resources in the BBS 18 for the BBS 18 to perform properly. If sufficient resources are determined to be available in step 304, then a count is made in step 306 of the number of CPs 62a–62n that are available for processing traffic after the initial allocation of CPs 62a–62n to ARFCNs.

Figure 12:
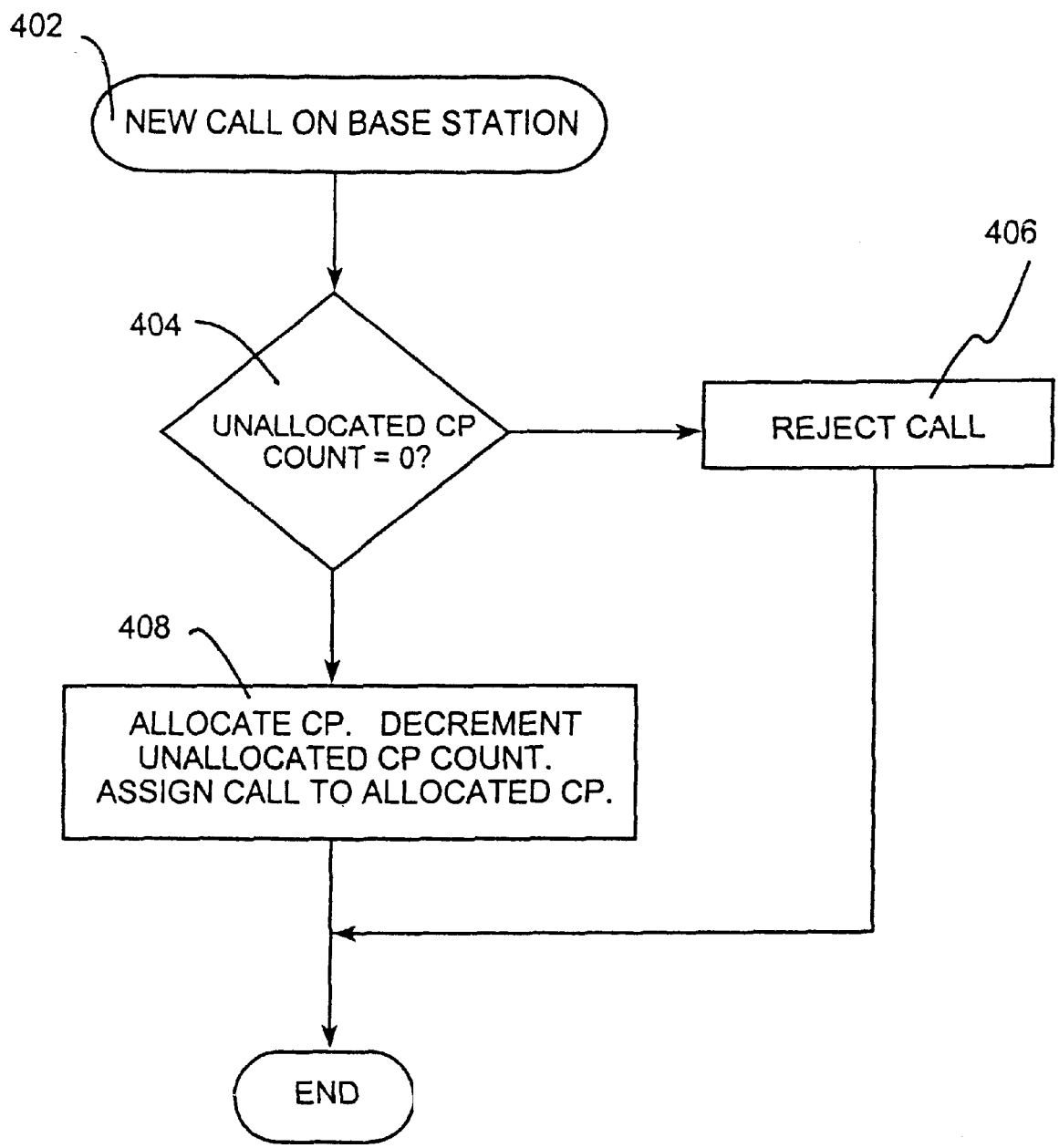
FIG. 12 is a flowchart for allocating individual CPs within a BBS for processing calls.

In FIG. 12, a method for allocating CPs 62a–62n for processing traffic received by the BBS 18, according to an embodiment of a present invention, is illustrated. In step 402, the BBS 18 receives a new call. In step 404, a determination is made as to whether there are unallocated CPs 62a–62n available for use in the BBS 18. If not, then in step 406, the call is rejected by the BBS 18. If CP 62a–62n resources are available, then in step 408, an available unallocated CP 62a–62n is allocated to the ARFCN for processing the new call. Furthermore in step 408, the unallocated CP count is decremented by one every time a CP 61a–62n is allocated.

This method is performed for new calls that are initiated within a cell of the BBS 18, or for calls that another base station is attempting to handover to the BBS 18. If a call is attempted to be handed over between two cells of the same BBS 18, the CP 62a–62n that is processing the call in the source cell of the can BBS 18 continue to process the call in the target cell. Thus, the CP 62a–62n is reallocated from an ARFCN in the source cell to an ARFCN in the target cell. This reallocation is performed by re-mapping the call on the TDM (A) Bus 32.

Figure 13:
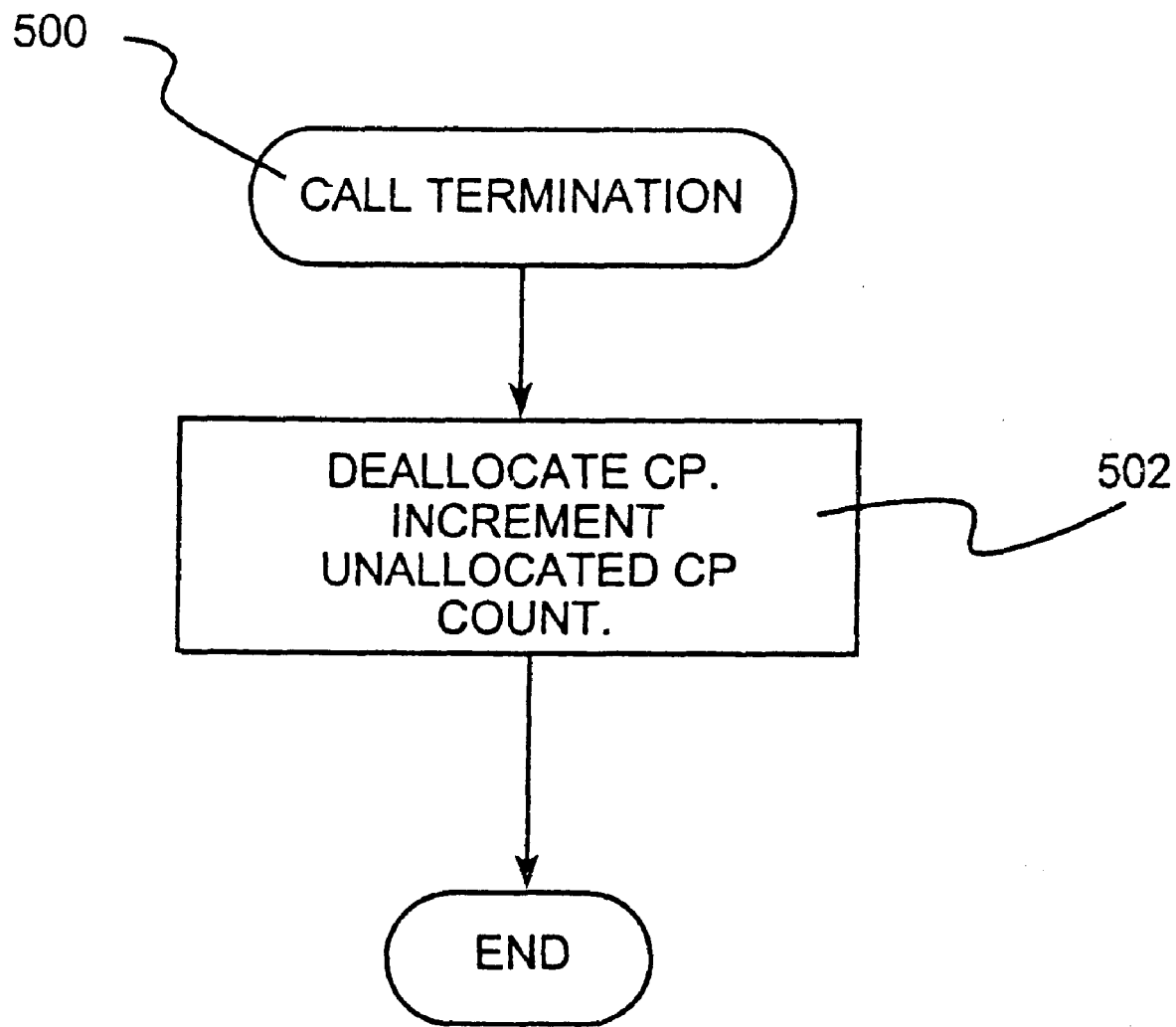
FIG. 13 is a flowchart for deallocating individual CPs within a BBS upon the termination of a call.

In FIG. 13, a method for deallocating CPs 62a–62n in the BBS 18, according to an embodiment of a present invention, is illustrated. This deallocation occurs whenever a call being processed by the CP 62a–62n is terminated, or whenever the call is handed over to another base station. There is no need for using the consolidation algorithm illustrated in FIG. 9 when using the DSP module architecture illustrated in FIG. 10. In step 500, a call being processed in the BBS 18 is terminated. In step 502, the CP 62a–62n that was processing the terminated call is deallocated from the ARFCN on which the call was being transmitted. Also in step 502, the unallocated CP count is incremented by the number of CPs 62a–62n that are deallocated upon the termination of calls. The DSP module 40a–40n waits for the next call to be initiated within the coverage area of the BBS 18, and the method illustrated in FIG. 12 begins again.

It should be understood that the examples and embodiments described herein are for illustrative purposes only and that various modifications or changes in light thereof will be suggested to persons skilled in the art and are to be included within the spirit and purview of this application.

The invention can take other specific forms without departing from the spirit or essential attributes thereof for an indication of the scope of the invention.

I claim:

1. A method for improving trunking efficiency in a sectorized wireless broadband base station (BBS) having a plurality of assigned absolute RF channel numbers (ARFCNs) for communications with mobile subscribers in a cellular communications network, comprising:

allocating at least one of said ARFCNs to each of a plurality of sectors, each said sector providing a communication link for subscriber calls in at least one of a plurality of communication cells serviced by said BBS;

upon a number of said subscriber calls in any said sector reaching a predetermined limit which exceeds a capacity for said at least one ARFCN, dynamically allocating sufficient processing resources to said sector to support allocation of at least one additional ARFCN, and allocating said additional ARFCN to said sector.

2. The method according to claim 1 wherein said processing resources comprise at least one digital signal processing resource.

3. The method according to claim 2 wherein said digital signal processing resource are each comprised of an RF processor (RFP) having a plurality of channel processors (CP) and a digital rate converter (RC) for translating a sample rate of a single baseband signal corresponding to any one of said ARFCNs.

4. The method according to claim 2 wherein each of said digital signal processing resource is comprised of a channel processor (CP) for processing any of a plurality of traffic channels contained on a single ARFCN.

5. The method according to claim 4 further comprising the step of multiplexing each of said plurality of traffic channels on a time division multiplexed communications bus, and selectively processing in each said CP only said traffic channel for which said CP has been allocated.

6. The method according to claim 2 further comprising the step of deallocating at least one of said ARFCNs from said sector when said subscriber calls in any said sector decreases below said predetermined limit.

7. A sectorized wireless broadband base station (BBS) having a plurality of assigned absolute RF channel numbers (ARFCNs) for communications with mobile subscribers in a cellular communications network, comprising:

means for allocating at least one of said ARFCNs to each of a plurality of sectors, each sector providing a communication link for subscriber calls in at least one of a plurality of communication cells serviced by said BBS;

means for dynamically allocating sufficient processing resources to said sector to support allocation of at least one additional ARFCN said sector upon a number of said subscriber calls in said sector reaching a predetermined limit which exceeds a capacity for said at least one ARFCN, and means for allocating said additional ARFCN to said sector.

8. The BBS according to claim 7 wherein said processing resources comprise at least one digital signal processing resource.

9. The BBS according to claim 8 wherein each said digital signal processing resource is comprised of an RF processor (RFP) having a plurality of channel processors (CP) and a digital rate converter (RC) for translating a sample rate of a single baseband signal corresponding to any one of said ARFCNs.

10. The BBS according to claim 8 wherein each said digital signal processing resource is comprised of a channel processor (CP) for processing any of a plurality of traffic channels contained on a single ARFCN, each said traffic channel corresponding to at least one of said subscriber calls and a control channel.

11. The BBS according to claim 10 further comprising means for multiplexing each of said plurality of traffic channels on a time division multiplexed communications bus, and for selectively processing in each said CP only said traffic channel for which said CP has been allocated.

12. The BBS according to claim 8 further comprising means for deallocating at least one of said ARFCNs from said sector when said subscriber calls in any said sector decreases below said predetermined limit.

* * * * *